Jan. 22, 1935.  L. KIEFNER  1,988,847
TREE AND STUMP CUTTER
Filed Aug. 14, 1934
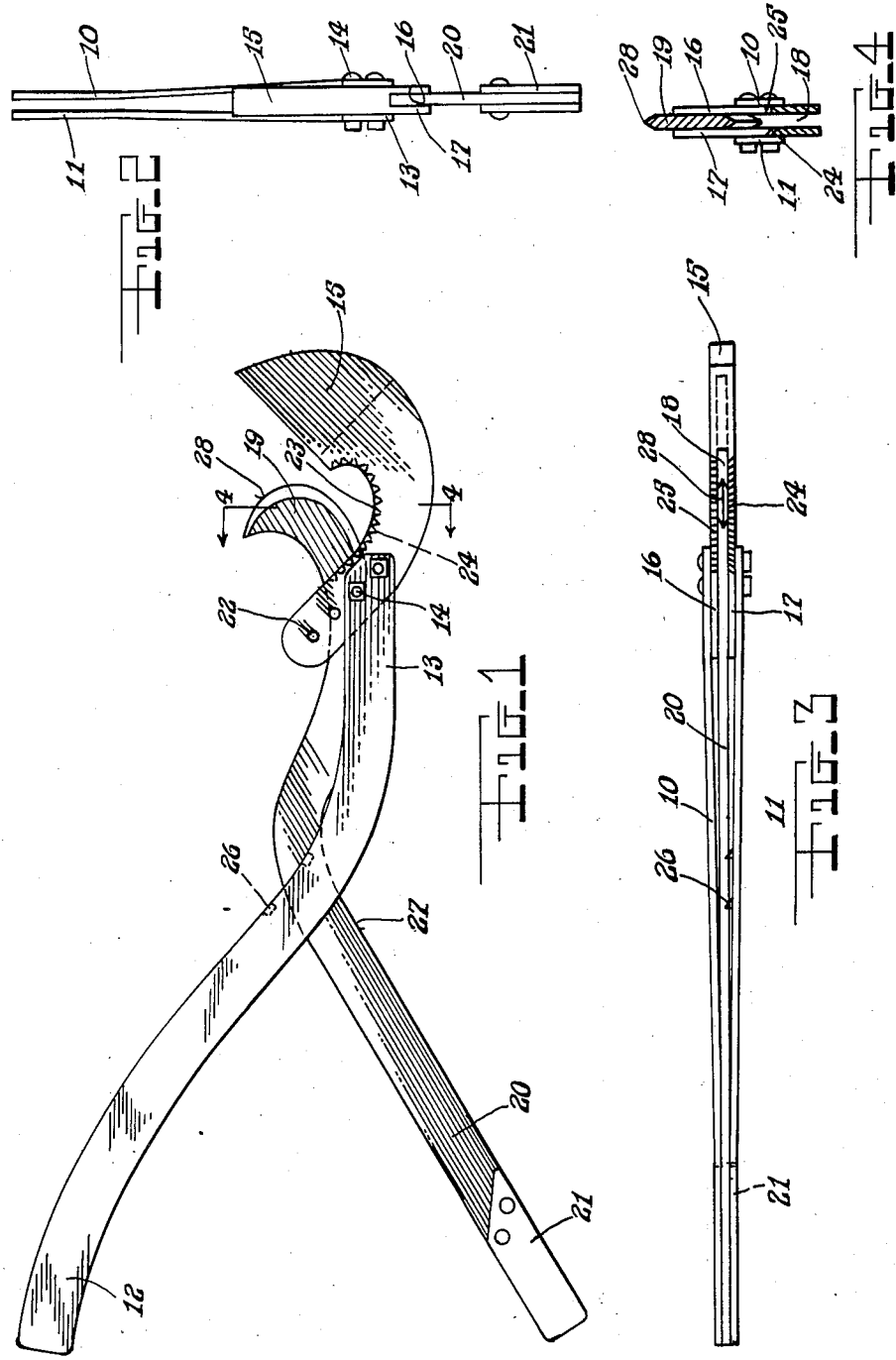
INVENTOR
*L. Kiefner*
BY HIS
*Emil Hauer*
ATTORNEY Patented Jan. 22, 1935

1,988,847

UNITED STATES PATENT OFFICE 1,988,847

TREE AND STUMP CUTTER

Leopold Kiefner, Irvington, N. J.

Application August 14, 1934, Serial No. 739,755

3 Claims. (Cl. 30—11)

The main object of this invention is to provide a tool or device for shearing saplings and similar other second growth wood.

Another object of the invention is to provide a sapling cutter which has an encompassing jaw and a knife blade, which latter, when swung, shears the sapling.

The above and other objects will become apparent in the description below, in which characters of reference refer to like-named parts in the drawing.

Referring briefly to the drawing, Figure 1 is a front elevational view of the tree cutter.

Figure 2 is an end elevational view of Figure 1.

Figure 3 is a side elevational view of Figure 1.

Figure 4 is a cross sectional view thru the tree cutter the section being taken on line 4—4 of Figure 1.

Referring in detail to the drawing, the numerals 10 and 11, indicate a pair of parallel and substantially S shaped bars whose outer ends 12 serve as one of the handles for the tree cutter. The straight ends 13 of these two superimposed bars are provided with spaced apart openings thru which bolts 14 are adapted to pass. A hook shaped grip anvil 15, having a pair of substantially curved arms 16 and 17, is secured to the bars 10 and 11, by said bolts 14. The curved arms are separated by a space 18, in which a hooked knife blade 19, is movable. This hooked knife blade is fulcrumed on one of the bolts 14, and extends rearward from the anvil 15, its opposite end 20, serving as a lever upon which a pair of stop blocks 21 are mounted. The arms 16 and 17, are provided with similarly spaced apart openings 22 so that the anvil may have its point of anchorage adjustably fitted to the tree cutter. The inner curved edge 23, of the arm 17, is provided with beveled teeth 24, which bite into the sapling and retain the tool in stationary position around a sapling. The other arm 16, is provided with straight teeth 25, which also aid in retaining the tool in stationary position about a sapling. Intermediate the length of the bars 10 and 11, a plurality of shoulders 26, are formed which are adapted to engage the receding edge 27, of the lever 20, and retain this lever in pressure position against the sapling so that a person may release his hold upon the tool and still retain the latter in useful position.

The device is adapted to cut in half and shear such articles as second growth wood and saplings. The curved portion 23, of member 15, is trained about the periphery of the sapling when the lever is spread away from the bars 12, so that the knife blade 19, does not lie in impeding position, and the pocket into which the sapling is inserted on member 15, is entirely free and clear. After this has been accomplished the lever 20, is swung about one of the bolts 14. In its swing the sharpened edge 27, of the curved knife blade cuts into the sapling and shears the same. It should be noted that the bars 10 and 11 are adapted to be made of resilient material so that the tendency is for these members to be mutually urged toward each other. Some saplings are of relatively tough material and the user of the tool in shearing one of these trees would become tired and strained when half thru the sapling. By urging the edge 27, to rest upon one of the shoulder members 26, the sapling may be cut half thru, and with the cooperation of the knife lever and shoulder 26, may rest his fingers preparatory to cutting the sapling thru its entire area.

It is to be noted that certain changes in form and construction may be made without departing from the spirit and scope of the invention.

I claim:

1. In a device of the class described a bifurcated anvil, a pair of bars extending from said anvil, arms on said anvil having said bars secured thereto, a knife lever pivotally located between said arms, means for adjusting the relative position of said anvil with respect to said knife lever and means for retaining said knife lever in thrusting position between said bars when cutting a tree.

2. In a device of the class described a bifurcated anvil, a pair of bars extending from said anvil, arms on said anvil having said bars secured thereto, a knife lever pivotally located between said arms, means for adjusting the relative position of said anvil with respect to said knife lever, said arms of said anvil having grip teeth thereon and shoulders on one of said bars engaging said knife lever for retaining the knife lever in non-retractable position when cutting a tree.

3. In a device of the class described a bifurcated anvil, a pair of bars extending from said anvil, arms on said anvil having said bars secured thereto, a knife lever pivotally located between said arms, means for adjusting the relative position of said anvil with respect to said knife lever, said arms of said anvil having grip teeth thereon and shoulders on one of said bars engaging said knife lever for retaining the knife lever in non-retractable position when cutting a tree, one of said arms having beveled teeth, the other of said arms having straight teeth and openings in said anvil cooperating with said bars for adjusting the position of said anvil with respect to said knife lever.

LEOPOLD KIEFNER.